Patented Nov. 7, 1922.

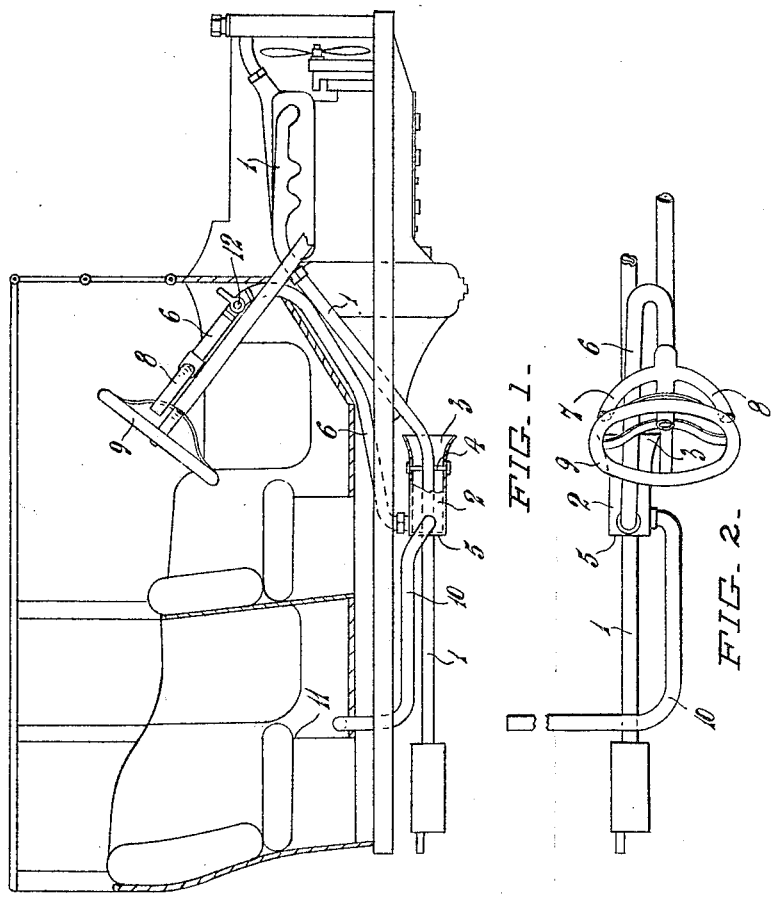

1,434,423

UNITED STATES PATENT OFFICE.

JOHN BASSETT, GEORGE EDWARD DOUGALD SEALE, AND GEORGE DAVIDSON, OF HOKITIKA, NEW ZEALAND.

AUTOMOBILE HEATER.

Application filed October 19, 1918. Serial No. 258,826.

*To all whom it may concern:*

Be it known that we, JOHN BASSETT, GEORGE EDWARD DOUGALD SEALE, and GEORGE DAVIDSON, all citizens of the Dominion of New Zealand, and residing at Hall Street, Hokitika, Sale Street, Hokitika, and Bealey Street, Hokitika, respectively, in the Provincial District of Westland, in the Dominion of New Zealand, have invented certain new and useful Improvements in Automobile Heaters, of which the following is a specification.

This invention provides means for utilizing waste heat of internal combustion engines for heating the hands, feet and body of the driver and passengers of a motor car or the like, or of the pilot of an aeroplane or the like.

The invention comprises a housing disposed around the exhaust pipe or other heated part of an internal combustion engine, and pipes leading from the housing to any desired part such as the steering wheel, the foot boards and seats of a vehicle or aeroplane or the like, air being admitted to the sleeve, and after being heated by the exhaust pipe or other part of the engine the air passes through the pipes and is distributed near or upon the steering wheel, foot board, seats or other part of the vehicle or machine.

The invention may be conveniently and advantageously carried into practice as illustrated in the accompanying drawing, which shows diagrammatically the invention applied to conveying heat to a steering wheel and the rear seat of a motor car.

Figure 1, is a diagrammatic sectional elevation, and

Figure 2, a plan of the invention adapted for conveying heated air to the steering wheel, and rear seat of a motor car.

As adapted for conveying heat from the exhaust pipe, 1, the housing comprises a sleeve 2 having a bell mouth 3 for the admission of air. The sleeve is fixed to the hottest accessible part of the exhaust pipe by screws 4, and near its closed end 5 and on its upper side is provided with a pipe 6, which may be led to any desired part, and as illustrated in the drawing has branches 7 and 8, which direct heated air to the steering wheel 9.

When the driver or pilot is grasping the steering wheel 9 his hands are subjected to the stream of heated air which rises from the housing 2 and through the pipe 6, and are thus kept comfortably warm.

Another pipe 10 leads from the sleeve 2 to the rear seat 11 and discharges heated air near the feet of passengers on the seat. When the knees of the passengers are covered by a rug the heated air is retained, and keeps the passengers comfortably warm.

In hot weather, when the heated air is not required a cock 12 in the pipe 6 is closed, or the amount of air is regulated by the said cock, so that any desired temperature may be obtained. The conveying of heated air to the interior of a motor car as above described has the effect of preventing fog from dimming the glass of the wind screen when driving through a fog.

It is to be noted that the inner closed end 5 supports the inner end of the sleeve while the screws 4 positioned near the mouth support the forward end of the sleeve and in addition bitingly engage the manifold and in this manner tend to prevent accidental movement of the sleeve. Moreover the connection of the pipes 6 and 10 with the sleeve also tends to prevent accidental movement of the sleeve.

What we desire to obtain and secure by Letters Patent of the United States is:—

In a motor vehicle heater the combination with the exhaust pipe of the engine, of a sleeve of a greater diameter than the diameter of the exhaust pipe and having the inner end closed and the opposite end open and flared outwardly to form a mouth, the inner end of the sleeve having a central aperture designed for adjustable and snug engagement with the exhaust pipe and in addition supporting the inner end of the sleeve in spaced relation with the exhaust pipe, outlet pipe connections near the inner end of the sleeve and adapted to receive heat conducting pipes, and screws passing through opposite points of the sleeve near the mouth for biting engagement with the exhaust pipe at the desired position of adjustment to support the outer end of the sleeve and prevent rotary and longitudinal movement of the sleeve with respect to the exhaust pipe.

In testimony whereof we have signed our names to this specification in the presence of two witnesses.

JOHN BASSETT.
GEORGE EDWARD DOUGALD SEALE.
GEORGE DAVIDSON.

Witnesses:
JOHN SAUNDERS,
K. A. GITCHINGHAM.